Figure 1:
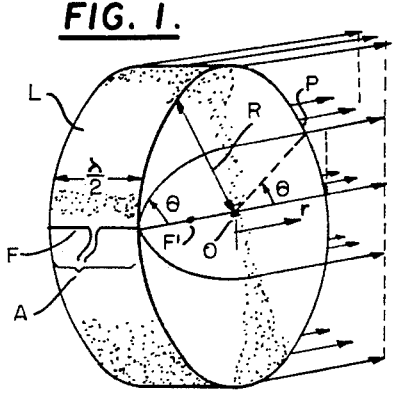

June 14, 1966  R. L. HORST  3,256,373
METHOD OF FORMING A CYLINDRICAL DIELECTRIC LENS
Original Filed July 11, 1962

INVENTOR
Robert L. Horst

BY Moore, Hall & Pollock
ATTORNEYS

United States Patent Office 3,256,373
Patented June 14, 1966

3,256,373
METHOD OF FORMING A CYLINDRICAL
DIELECTRIC LENS
Robert L. Horst, 1568 Linden Ave., Lancaster, Pa.
Original application July 11, 1962, Ser. No. 209,075.
Divided and this application Aug. 17, 1962, Ser. No. 217,751
11 Claims. (Cl. 264—45)

This application is a division of my prior copending application Serial No. 209,075, filed July 11, 1962 for "Three-Dimensional Dielectric Lens and Method of Forming the Same," now abandoned.

The present invention relates to the fabrication of an improved dielectric lens, e.g., a Luneberg lens, a Maxwell lens, a Kelleher lens, or the like, characterized by a dielectric constant and hence a refractive index which varies substantially continuously as a function of the lens radial coordinate. In this respect, the lens of the present invention distinguishes from so-called step-function lenses which have been produced heretofore in that, through a continuous grading of dielectric constant, the novel monolithic lens of the present invention is adapted to effect a performance more nearly approaching theoretical performances than has been possible heretofore.

During the last decade, there have been numerous attempts at the fabrication of high quality dielectric lenses for use at high radio frequency, and particularly at frequencies in the microwave portion of the spectrum. One such dielectric lens suggested heretofore is the so-called Luneberg lens, a lens which may take the form of either a cylindrical two-dimensional lens or a spherical three-dimensional device, depending upon the focus desired and the configuration of the feed horn or antenna. In such a lens, for example of the cylindrical type, Luneberg has shown that, in theory, if electromagnetic energy in the form of a plane wave impinges upon the device, said electromagnetic energy will be refracted and concentrated as a line focus along a line generally parallel to the axis of the lens and located at the surface of the lens. In order for the lens to operate in this manner, Luneberg has further shown that the refractive index ($n$) of the lens must vary as a function of the radial coordinate ($r$) of the lens according to an equation which reduces to:

$$n = \sqrt{2 - \left(\frac{r}{R}\right)^2} \quad (1)$$

where R is the lens radius. Based upon the results of Luneberg's work, subsequent workers in the field have shown that by appropriate modification of the dielectric gradation, the actual position of the focus at the lens (Luneberg has shown that a second focus would also exist, in theory, at infinity) may be shifted to other positions either interior of the lens or spaced externally of the lens surface.

As will be appreciated from the formula given above, the dielectric constant or refractive index of the lens should vary continuously as a function of the lens radial coordinate if operation according to the theoretical is to be achieved. To the present time, however, no practical techniques have been suggested for fabricating a dielectric lens having such a continuously varying dielectric constant. Accordingly, it is the practice at the present time to fabricate such lenses by assembling various lens subcomponents (e.g., blocks of material, concentric cylinders, or shells, etc.) to effect a step-wise approximation of the theoretical refractive index gradation.

These step construction techniques, prevalent at the present time, are accompanied by a number of distinct disadvantages. For example, the very fact that the lenses are assembled from a plurality of subcomponents or constructional modules having different dielectric constants necessarily results in dielectric discontinuities at the abutting junctions of the subcomponents, with attendant reflections and losses at these discontinuities; and these losses and reflections are aggravated by possible physical discontinuities (air gaps, cement joints, etc.) at said subcomponent junctions produced during assembly of the overall lens. Refinement of such a lens necessitates reduction of the dielectric step size, thereby requiring constructional modules of smaller dimensions. The consequent increase in the number of modules employed obviously serves to further complicate the interface problem, in that a multiplicity of junctions exists, each of which represents a dielectric discontinuity and as such is a reflecting plane. The fractional reflected power for wave (normal) incidence at such dielectric interface is described by the well-known relationship $$R^2 = \frac{(n_1 - n_2)^2}{(n_1 + n_2)^2}$$

where R is the reflection coefficient and $n_1$, $n_2$ are the refractive indices of the two mediums. Similar expressions describe reflection for arbitrary angles of incidence and are presented in many texts on electromagnetic field theory, e.g., "Electromagnetic Fields and Waves"— R. V. Langmuir. The undesired reflections always accompany the desired wave refraction, and are by no means insignificant as can be seen by evaluation of the equations noted.

A further disadvantage is that a step constructed lens of types suggested heretofore, must be "assembled"; and such assembly steps are extremely time-consuming and costly procedures if extraneous physical discontinuities are to be minimized. Moreover, the assembly techniques employed heretofore necessarily require that lens testing procedures be deferred until after the lens has been completely assembled; and there is no way to evaluate the final lens structure, as a lens, without first expending time and money in assembly.

Finally, notwithstanding all of these difficulties, the resulting step-function lens, even if carefully made, necessarily does not conform to theoretical operation since, by the very nature of the lens, it comprises a stepped dielectric gradation rather than a continuously varying gradation.

The present invention obviates the various problems mentioned, and produces a novel lens structure wherein the lens dielectric constant varies continuously as a function of the lens radial coordinate in accordance with any particular formula which may be selected for a particular lens. A novel lens is thus provided which receives and transmits electromagnetic radiation in a pattern more closely approximating that calculated by theory than has been possible heretofore. Moreover, the present invention achieves this result by a novel fabrication technique which directly produces a lens having the desired continuous variation without requiring assembly steps. The lens of the present invention may therefore be evaluated as a lens immediately after completion of its fabrication, without the necessity of expending the considerable time and costs attendant lens assembly procedures normally employed heretofore.

It is accordingly an object of the present invention to provide a method of fabricating an improved mass of dielectric material, particularly a dielectric lens, having a dielectric constant which exhibits a smoothly varying gradation in accordance with any desired formula characteristic, for example, of a particular lens to be produced. In the specific example to be described hereinafter, the fabrication of a Luneberg lens will be described, and more particularly, a Luneberg lens of the cylindrical type; but as will be apparent, the techniques here involved may be utilized in the fabrication of masses having other physical and mathematical (or optical) configurations.

Another object of the present invention resides in the provision of a method of fabricating an improved dielectric lens eliminating dielectric discontinuities, wave reflections, and energy losses which have characterized the step-function dielectric lenses which are conventional at the present time.

Still another object of the present invention resides in the manufacture of a novel dielectric lens which may be more readily fabricated, and at less cost, and which may be more readily tested and evaluated as a lens than has been possible heretofore.

Still another object of the present invention resides in the provision of a novel fabrication technique as well as a novel arrangement for feeding dielectric materials, adapted to produce a continuously varying dielectric constant (hence a continuously varying refractive index) across a body of dielectric material.

In achieving the various objects and advantages described above, the present invention contemplates the fabrication of a body of continuously varying dielectric constant material formed from, for example, an artificial dielectric consisting of an array of randomly oriented metallic particles supported by a low density dielectric material. The said metallic particles may comprise insulated aluminum slivers, preferably of substantially needle shape having a length less than one-eighth wavelength. The supporting matrix, in turn, may take the form of a low loss polystyrene foam similar to commercially available "Armalite," a trademark of the Armstrong Cork Company, Lancaster, Pennsylvania, fabricated from low density polystyrene beads or spheroids, also preferably less than one-eighth wavelength in size. Composite materials of this type simulate an actual dielectric when immersed in an electromagnetic field. In particular, in a dielectric medium submicroscopic dipoles are set up by the impressed field and serve to alter the velocity of propagation of the wave; and in an artificial dielectric material of the type described, this principal effect is achieved macroscopically by the conductive particles, i.e., the randomly oriented metallic slivers of millimetric length act to delay waves of centimetric length (microwave situation).

In working with artificial dielectric materials of the type described, a cross feeding system or technique is preferably employed wherein a mass of dielectric beads, interspersed with flakes or slivers of aluminum (whereby the composite mass exhibits a dielectric constant greater than unity) is cross-fed with a lower index dielectric medium, comprising for example plain polystyrene beads identical to those which serve as the vehicle for the metallic slivers. These two flowing streams of dielectric material, respectively having dielectric constants greater than and substantially equal to unity, are fed into a charge box of appropriate geometry (e.g., a substantially cylindrical charge box, in the case of a cylindrical lens) through specially contoured gates associated respectively with the flowing streams; and the charge box is rotated as the cross-fed material is fed therein. The gate contours, which will be described hereinafter, assure that the desired continuously varying index, as well as a uniform depth of material is effected in the rotating charge box. A similar cross-feeding technique may be employed to effect a charge of true dielectric material (rather than a sliver loaded artificial dielectric material) having the desired continuously varying index. Such a true dielectric material may comprise, for example, a mixture of polystyrene particles having different densities. Thus, again using a cross-feeding technique as described, one of the two flowing streams may comprise foamed polystyrene particles, and the other stream may comprise unfoamed polystyrene particles; and these streams may, in the manner described, be fed to a substantially cylindrical charge box, e.g., via appropriate contoured gates, to achieve the desired two-dimensional variation in refractive index from the center of said charge box to its outer edge. In either case, i.e., using true or artificial dielectric materials, the refractive index variation is achieved by controlling and varying the loading concentration of the cross-fed materials.

The substantially smooth lay-up of dielectric material thus effected, having the desired continuous dielectric constant gradation therein, is then fused into a unitary substantially cylindrical mass, e.g., by a steam molding process; and the unit thus produced may then be unmolded and heat-treated for an appropriate extended period of time to effect the removal of all moisture and also to insure dimensional stability in the final device.

The resulting cylindrical unit has a continuously varying dielectric constant whereby it may be used directly as a dielectric lens or, in conjunction with a conductive piece, as a microwave or radar reflector, e.g., in a buoy structure as a navigational aid. In the alternative, said unit can be associated with a dipole or other appropriate primary feed antenna positioned along the focal line of the lens as in the Luneberg embodiment, or at the focal point, as in the constant thickness Kelleher lens, to form a high gain antenna. Moreover, notwithstanding the fact that the cylindrical unit produced by the technique of the present invention finds direct utility in a lens, antenna, or reflector structure, the unit may, if desired, be cut into subcomponents and reassembled in different configurations to provide more complex lenses nevertheless having desired substantially continuous dielectric gradations.

Figure 3:
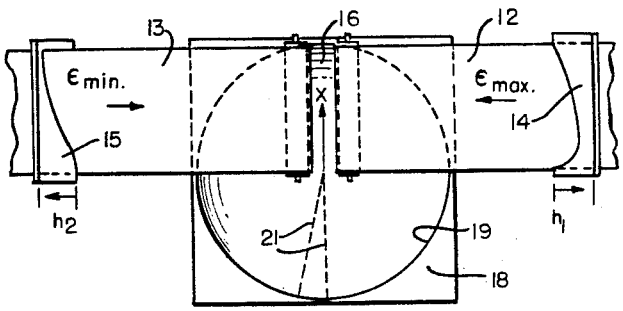
Figure 2A:
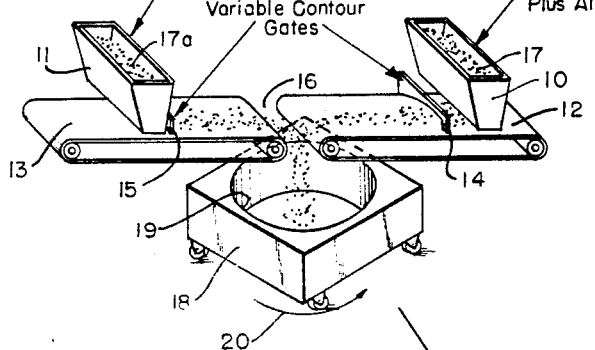
Figure 2B:
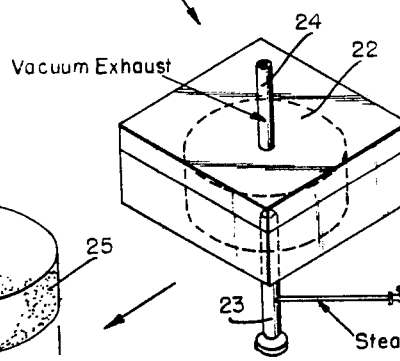
Figure 2C:
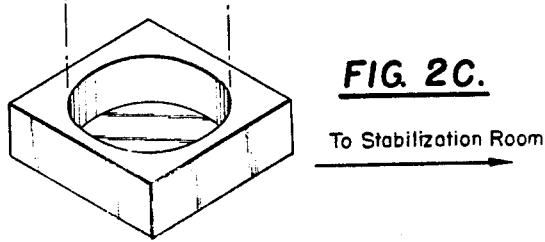

The foregoing objects, advantages, construction and operation of the present invention will become more readily apparent from the following description and accompanying drawings, in which:

FIGURE 1 is an illustrative view of a substantially cylindrical two-dimensional dielectric lens fabricated in accordance with the present invention, depicting certain optical considerations characterizing one form of said lens;

FIGURES 2A, 2B and 2C illustrate an apparatus which may be employed in fabricating the lens of the present invention, as well as successive steps in the method of lens formation which characterizes a preferred embodiment of the present invention; and FIGURE 3 is a top view of a portion of the system shown in FIGURE 2A illustrating a preferred feeding arrangement employing contoured gates in accordance with the present invention.

Referring initially to FIGURE 1, it will be seen that the lens L of the present invention may be substantially cylindrical in form having its axial center at O. The lens itself exhibits a substantially smooth and continuous variation in dielectric constant along the radii R of the lens between its center O and the outermost periphery of the lens. This variation in dielectric constant may be accomplished, by the technique of the present invention, utilizing conventional dielectric materials; but in a preferred embodiment of the invention, the variation in dielectric constant is achieved by use of an artificial dielectric material comprising a matrix of near-unity dielectric constant material supporting a randomly oriented array of needle-like metallic particles therein, with the concentration of said metallic particles in said matrix varying smoothly in substantially all directions from the central axis O of the lens to its outermost peripheral surface.

Moreover, in accordance with the present invention, the lens L is of substantially constant density; and this must be distinguished from variable density materials and lens which have been suggested heretofore, wherein attempted variations in dielectric constant are achieved by starting with a substantially constant density material which is variably compressed to effect a dielectric gradation. Such varying density lenses, suggested heretofore in an effort to achieve a desired dielectric gradation, in addition to necessarily being "short" cylinders due to nonlinearities inherent along the compression axis, have been found in practice to be anisotropic, i.e., the variation in dielectric constant actually achieved has been found to be a function of aspect, with a given incremental unit of the lens exhibiting different dielectric constants in different directions. Such anisotropic variable density lenses cause rotation of the field vectors during the propagation of energy through the lens medium, whereby the polarization and velocity of a transmitted or received wave is altered in the lens; and this phenomenon has itself caused the resulting lens to depart from that contemplated in theory, since one theoretical advantage of, for example, a Luneberg lens, is that the polarization of a propagated wave is not affected.

The lens L of the present invention, being of constant density, and achieving its dielectric gradation by a variation in loading concentration in a substantially constant density dielectric medium, is thus specifically different from variable density lenses suggested heretofore, and obviates problems which have characterized such prior lenses.

The lens L of FIGURE 1 has been depicted as a Luneberg lens, and defines a line focus F at a surface of the lens. A dipole antenna A may be disposed adjacent the surface of the lens along said line focus F for injecting energy into the lens, or receiving signals therefrom; and in practice said antenna A may comprise a wire or tube of appropriate cross-section arranged to be supported by the lens itself. In actual use, the operating frequency may be such that the lens L is ½ wavelength long in the direction indicated in FIGURE 1, in which case the dipole antenna A could be employed as the primary (feed or pick-up) antenna; or the operating frequency could be such that the lens is several wavelengths long, in which case a pyramidal or sectoral horn antenna or the like could be employed. The natural directivity of the lens may, moreover, be improved in the former (or half wavelength) case, by adding a reflector element at a distance of approximately 0.2 wavelength to the rear of the antenna A with said reflector element, if employed, being slightly greater than ½ wavelength long and being physically supported in place by means such as an appropriate insulator structure.

It will be appreciated, moreover, that the disposition of the antenna A along the focal line F has been shown at the external surface of the lens on the premise that the lens L is of the Luneberg type; and this particular type of lens will in fact be discussed hereinafter. The various techniques to be described, however, can be employed in fabricating lenses of the type shown at L in FIGURE 1 wherein, by appropriate alteration of the loading concentration of the artificial dielectric material employed, the optics of the lens vary in some manner other than that suggested by Luneberg, and in accordance with the suggestions of other workers in the field. By appropriate variation of the dielectric gradation, the focus F may actually occur for example along a line F' internal of the lens, in which event the antenna A may be physically embedded in the lens L, along the line F'. Similarly, by other suitable modifications, the location of the focus may be caused to occur along a line external of the outer lens surface, in which event the antenna A may be physically supported along this alternative line focus in proper spaced relation to the exterior lens surface, e.g., by appropriate insulator structures. In still other embodiments, the constant thickness Kelleher lens for example, the focus exists on a line passing through the geometric axis of the cylinder, and an appropriate feed antenna placed at the focal point would, in such a case, provide plane wave propagation (or reception) in a direction normal to the plane surfaces of the lens. The present invention, being concerned with the lens itself, may therefore be used ultimately in any of these various manners, and with any of the various feed structures and dispositions which one skilled in the art may wish to select.

Considering now the actual lens L shown in FIGURE 1, and assuming that said lens L is, for purposes of the instant description, of the Luneberg type, the refractive index ($n$) of the lens should, as mentioned previously, vary as a function of the lens radial coordinates ($r$) in accordance with Equation 1, supra. If this relationship is achieved, any rays entering the lens along its focal line F will be focussed by the lens L into parallel rays so as to emerge from the lens as a plane wave front. In particular, as illustrated in FIGURE 1, any single ray leaving the source at focus F at an angle $\theta$ will be radiated from the lens L at a point P so positioned that the radius OP of the lens also forms an angle $\theta$. Similarly, since reciprocity applies, any electromagnetic energy in the form of a plane wave impinging on the lens L will be refracted and concentrated at the line focus F. These relationships contemplated by theory can be achieved, however, only if the refractive index varies in accordance with Equation 1, supra; and said relationships have thus far been only approximated by the use of stepped-index lenses, or by variable density lenses, with the disadvantages of each having already been discussed.

In accordance with the present invention, a highly improved lens, characterized by a smoothly and continuously varying dielectric constant in a substantially constant density medium, is fabricated by a novel method thereby to obviate the various problems and disadvantages described above. The two-dimensional continuously graded material which characterizes lens L can be effected by various techniques operative to achieve a smooth variation in loading concentration in radial directions of the lens; but a highly preferred such technique is that illustrated in FIGURES 2A through 2C and 3, wherein a blend feeder employing a dilution technique is used in the lens fabrication. To this effect, a pair of hoppers 10 and 11, associated with a pair of aligned conveyors 12 and 13 and with a pair of appropriately contoured gates 14 and 15, effect a substantially constant flow of varyingly loaded dielectric material to a central discharge point or line 16. Hopper 10 contains a pre-mixed blend 17 of polystyrene beads and aluminum slivers, having a dielectric constant greater than 1; and in particular having a dielectric constant of $\epsilon_{max}$, the maximum dielectric constant required by the final lens. In a typical case, this high index blend 17 may have a dielectric constant of 1.92. The hopper 11 in turn contains a diluent 17a having a low index dielectric material therein comprising, for example, plain polystyrene particles identical to those which serve as the vehicle for the metallic slivers in blend 17; and in a typical case, the dielectric constant $\epsilon_{min}$ of the plain polystyrene beads in hopper 11 may be 1.03.

While it has been indicated that the mixed blend 17 is contained in a hopper 10 as a pre-mixed batch of material, even more accuracy in the final product can be achieved by replacing hopper 10 with a preliminary pair of conveyors and hoppers adapted, by a dilution technique similar to that shown in FIGURE 2A, to effect a highly accurate blend having the desired dielectric constant, e.g., 1.92. To this effect, the hopper 10 may be replaced by a further pair of auxiliary conveyors associated in turn with a further pair of hoppers. One of these further hoppers may contain a batch of blended polystyrene particles and aluminum slivers having a dielectric constant higher than that desired of the material on conveyor 12; and the second of these hoppers may contain plain polystyrene beads. The material in these two hoppers may be fed along said two auxiliary conveyors through automatically controlled gates, the vertical positions of which may be variably changed with changes in the actual dielectric constant of the material passing along at least one of said conveyors. The gate control can be achieved by an appropriate sensing circuit, all as shown, for example, in my prior copending application Serial No. 52,932 filed August 30, 1960 for "Admittance Meter and Dielectric Control System."

With this further refinement the initially mixed blend would be discharged from the aforementioned auxiliary conveyors onto conveyor 12 at a position equivalent to the discharge end of hopper 10; and by the arrangement described, an extremely accurate control of the dielectric constant of the mixed blend passing along conveyor 12 would then be achieved. This, however, represents a refinement which is not essential to the present invention; and the actual arrangement shown in FIGURE 2A, utilizing a pre-mixed blend in hopper 10, gives entirely adequate results.

The material in the hoppers 10 and 11 passes, as described previously, through contoured gates 14 and 15 to discharge point 16 whereupon the resulting mixed blend of relatively high index and relatively low (or near-unity) index dielectric material is dumped into a charge box 18 (or mold) having a substantially cylindrical recess 19. The width of each of conveyors 12 and 13, and the length of contoured gates 14 and 15, is chosen to be equal to either the radius or the diameter of the final planned lens; and is similarly chosen to equal a radius or diameter of the recess 19 in charge box 18. Radial length gates and conveyors have been shown in the drawings; but each radial length gate may be expanded to diameter length by adding, to each such gate, a further gate section contoured as the mirror image of the gate actually shown and to be described.

In the case of the radial width conveyors and gates, and as best shown in FIGURE 3, the aligned conveyors 12 and 13 are so positioned with respect to charge box 18 that their respective edges lie between the center and outer periphery of recess 19. The blend of material discharged at 16 into recess 19 is therefore laid up in said recess 19 along a radius of the recess. During this lay up, charge box 18 is rotated as at 20 to distribute the material evenly and with circular symmetry along the complete circular cross section of recess 19, with the rate of rotation merely being sufficiently fast to assure a smooth and symmetrical lay up of the dielectric material in charge box 18.

The desired variation in dielectric constant across the radii of the granular substantially cylindrical mass deposited in recess 19 is effected by reason of the aforementioned rotation of charge box 18, cooperating with the contoured gates 14 and 15. The actual contour of these gates is selected in accordance with the particular type of lens which it is desired to finally produce; and in the case of a Luneberg lens, the contours of said gates 14 and 15 may be similar to those shown in FIGURE 3. In such a Luneberg lens, the refractive index ($n$) should vary in accordance with Equation 1 given previously; and this may be expressed also as a variation in dielectric constant ($\epsilon$) by the equation:

$$\epsilon = 2 - \left(\frac{r}{R}\right)^2 \quad (2)$$

where, $R$ = the lens radius (or the conveyor belt width in the arrangement of FIGURES 2A and 3);
$r$ = the radial variable in planes parallel to the bottom of recess 19 (see also, FIGURE 1); and
$\epsilon$ = the relative dielectric constant of the material corresponding to any particular point $r$.

For such a relationship, the contour of gate 14, associated with the relatively high index blend 17 in hopper 10 can be expressed by the equation:

$$h_1 = \frac{Kx}{R}\left(1 - \frac{x^2}{R^2}\right) \{0 \leq x \leq R\} \quad (3)$$

where, $R$ = the radius of the lens;
$x$ = the distance variable (corresponding to the radial variable) in directions across conveyor belt 12 (see FIGURE 3) from the center of recess 19;
$K$ = a feeder constant, equal to $$H/(\epsilon_{max} - 1)$$

where H is the maximum gate opening achievable; and $h_1$ = the variable height of the aperture in gate 14.

In addition, the contour gate 15, associated with the hopper 11 containing near-unity dielectric constant plain polystyrene beads, can be expressed by the equation:

$$h_2 = \frac{K}{R}(\epsilon_{max} - 1)x - h_1 \{0 \leq x \leq R\} \quad (4)$$

where, $h_2$ is the variable height of the aperture in gate 15.

Each of the other variables in Equation 4 have been discussed previously.

The two gates 14 and 15 are maintained in fixed position relative to conveyors 12 and 13, and provide a substantially constant (with time) flow of material at discharge point 16. In addition, the contours of the two gates are so selected as to achieve the desired uniform gradation in dielectric constant across the radius (or diameter) of recess 19 as the charge box 18 is rotated. In effect, gates 14 and 15 achieve this desired gradation in dielectric constant by effecting an appropriate variation in the loading of the blend across the radius R of recess 19, at position 16. The said gates 14 and 15 moreover cooperate with one another to achieve a combined flow having a smoothly varying rate at different points along the radius of recess 19; and the actual deposition of material follows the substantially triangular configuration shown at 21 in FIGURE 3, comprising substantially zero flow at the center of the recess 19 and maximum flow at the circumference of said recess 19. This triangular dumping or deposition of the granular dielectric material assures that a substantially smooth lay-up of said material is achieved in cylindrical recess 19 as charge box 18 is rotated.

It will be appreciated, of course, that arrangements alternative to those shown in FIGURES 2A and 3 are available to achieve substantially similar final results. By way of example, the conveyor belts 12 and 13, rather than having a width substantially equal to the radius of recess 19, and rather than being associated with contoured gates such as 14 and 15, can be replaced by small capacity feeders having a width much less than the radius of the charge box. With this alternative arrangement, the actual dielectric constant of the material flowing along the small capacity feeders can be appropriately programmed as required for a given lens configuration, e.g., in accordance with Equations 3 and 4 for a Luneberg lens; and the charge box can also be position-programmed, i.e., rotated and translated, with corresponding changes of the dielectric constant of the material flowing toward the charge box, all to achieve the necessary smooth lay-up and substantially continuous dielectric variation which is desired.

After the charge box 18, and particularly the recess 19, has been filled with material in accordance with the technique described (and it will be appreciated, of course, that charge box 18 may itself comprise a mold if practicable) the lay-up may then be fused into a complete and homogeneous cylindrical unit, e.g., by a steam molding process. An apparatus such as that shown in FIGURE 2B may be employed to this effect, whereby the charge 22 in the final lay-up may be subjected to steam flow through pipe 23, the opposite side of the apparatus being coupled to a vacuum exhaust 24. In such a steam molding step, the arrangement shown in FIGURE 2B is particularly desirable since it achieves steam flow in directions normal to the lens surface; and such flow is highly preferred in order that any density shifts which might occur during fusion may be accommodated from a dielectric standpoint in the final lens.

After completion of the fusion process, the fused lens 25 may be unmolded as shown in FIGURE 2C; and said lens 25 may then be heat-treated for an extended period of time to effect removal of all moisture therefrom, as well as to insure dimensional stability. In a typical case (e.g., using a polystyrene matrix), moisture removal and stress relief can be effected in a stabilization room wherein fused lens 25 is subjected to a constant temperature of approximately 170° F. for a period of three to seven days.

The resulting mass 25 is, it will be appreciated, of cylindrical configuration and defines a smoothly varying dielectric constant gradation along its radii. The outermost surface of cylindrical mass 25 is, as a result of the contours of gates 14 and 15, substantially comprised of plain polystyrene beads only whereby this outer surface has a dielectric constant which closely approximates that of surrounding air. In the final lens, dielectric discontinuities at the outer surface of the lens are thus substantially eliminated, thereby minimizing losses as energy passes into or out of the lens. It will be further appreciated that the graded cylinder 25 is formed readily and relatively inexpensively by a unique and reproducible process. Accordingly, once the initial fabrication techniques shown in FIGURES 2A through 2C, and 3 has been finalized, highly uniform lenses can be made in mass production.

It should further be noted that, once the cylindrical lens 25 has been completed, it is immediately possible and indeed desirable to test the cylinder at the ultimate frequency of operation. By such a testing technique, the lens quality and focal point can be readily established without need of the costly and time-consuming assembly steps which have characterized lens fabrication techniques suggested heretofore. Moreover, if the lens characteristics are found to depart from those desired, the artificial dielectric media, and/or the loading concentration therein, can be appropriately changed before continuing with the fabrication of further lens units. This, in itself, represents a significant additional saving in money and labor over techniques suggested heretofore, since it assures proper and consistent performance of mass produced lenses. By such a testing technique, the actual dielectric gradation across the lens can be determined; and if it is found that this gradation departs from that actually desired, simple adjustments of the contours of gates 14 and 15 can be effected to take care of such deviations at the particular point of lay-up where the discrepancy has occurred. With such adjustment of the gate contour and/or dielectric media, the accuracy of subsequent lenses can thus be immediately assured; and this accuracy will persist as multiple such lenses are fabricated, a result impossible heretofore.

The two-dimensionally graded cylinder 25, produced by the technique described above, can itself be used directly as a lens element, such as that indicated at L in FIGURE 1, and comprises in this respect an operable two-dimensional Luneberg lens differing from prior such two-dimensional lenses suggested heretofore in the fact that it is inherently circularly symmetric, exhibits a substantially smooth dielectric gradient in a substantially constant density media, and has no interior interfaces or dielectric discontinuities. The cylindrical lens of the present invention, moreover, differs from previous dielectric lenses of cylindrical configuration, of both stepped-index form and otherwise, in that such prior lenses have ordinarily taken the form of extremely short cylinders having a height much less than their diameter, whereby a severe limitation has been imposed on the type of feed antenna which could be employed. This difficulty is avoided by the present invention, since the cylindrical mass 25 may readily have a height-diameter ratio which is considerably greater than that which has been possible heretofore; and in one practical lens embodiment, fabricated by the described technique, the cylindrical mass 25 was approximately eighteen inches in height and approximately three feet in diameter. The technique described may, moreover, be utilized to form lenses of different sizes, both larger and smaller than that mentioned; and the largest lens which can be fabricated is limited only by such physical limitations as the size of the molds 18 which are available to receive the initial charge. Indeed, the substantially circular cross-section mass could be fabricated and molded as a continuum (rather than as units) in which case cylinders of appropriate height can be produced simply by cutting at appropriate points along the length of the fused mass. The present invention is particularly useful in the construction of relatively small diameter lenses (e.g., less than ten feet in diameter); but there is no theoretical restriction on the lens size or electrical or dimensional configuration which may be produced.

The cylindrical two-dimensionally graded mass 25 may moreover be utilized as a starting material in the fabrication of more complex lens forms, e.g., one or more such masses 25 can be severed into variously shaped subcomponents which may thereafter be reassembled in different configurations when more complex lens formations are desired or required by a particular installation. The lens or mass 25 may, in addition, be protected, subsequent to its final fabrication, by an appropriate outer shell such as a thin glass-reinforced polyester shell, so as to reduce possible deterioration or splintering of the lens and to also render the lens substantially impervious to sun, water, and marine parasites (in the case of marine use, e.g., as a navigational aid or buoy).

Still other variations and modifications will be suggested to those skilled in the art. It must, therefore, be understood that while I have thus described a preferred technique and embodiment of the present invention, all such variations and modifications as are in accord with the principles of the present invention are meant to fall within the scope of the appended claims.

Having thus described my invention, I claim:

1. The method of fabricating a mass of dielectric material having a substantially continuous variation in dielectric constant which comprises the steps of cross-feeding a granular dielectric material of near-unity dielectric constant with a granular dielectric material of higher dielectric constant, said cross-feeding being effected into and along a radius of a substantially cylindrical charge box with varying amounts of said materials being mixed with one another at different points along said radius, rotating said charge box during said cross-feeding to build up a circularly symmetrical mass of said cross-fed granular material, and fusing the granular material in said charge box into a homogeneous substantially cylindrical mass of two-dimensionally graded dielectric material.

2. The method of claim 1 wherein said fusing step comprises subjecting the cross-fed material in said charge box to steam directed normally to the outermost faces of said circularly symmetrical mass.

3. The method of claim 1 wherein said higher dielectric constant material comprises a conductive sliver loaded artificial dielectric material, said cross feeding step including the step of feeding said materials through differently contoured gates to vary the amounts of said two dielectric materials which are mixed with one another along the radius of said charge box thereby to vary the loading concentration of said cross-fed material along said radius.

4. The method of claim 3 wherein said cross feeding step comprises feeding said higher dielectric constant material through a contoured gate having a height, $h_1$, substantially defined by the equation:

$$h_1 = \frac{Kx}{R}\left(1 - \frac{x^2}{R^2}\right)$$

and feeding said near-unity dielectric material through a differently contoured gate having a height, $h_2$, substantially defined by the equation:

$$h_2 = \frac{K}{R}(\epsilon_{max}-1)x - h_1$$

where $\epsilon_{max}$ is the index of said higher dielectric constant material, R is the radius of said charge box, $x$ is the dimension of the feed point along said radius, and K is a constant.

5. The method of fabricating a mass of dielectric material which comprises feeding a first dielectric material of relatively high dielectric constant toward a discharge line via a first contoured gate, feeding a second dielectric material of relatively low dielectric constant toward said discharge line via a second differently contoured gate, mixing said first and second dielectric materials at said discharge line thereby to produce a mass of varying dielectric constant material having a variation in dielectric constant along said line determined by the relative dielectric constants of said first and second materials and by the differences in contour of said gates, collecting said mixed varying constant dielectric material in a collection receptacle while effecting relative motion between said receptacle and said discharge line, and thereafter fusing the collected material.

6. The method of claim 5 wherein said step of effecting relative motion comprises rotating said receptacle during said collection to build up a circularly symmetrical mass of said varying constant dielectric material.

7. The method of claim 6 wherein said receptacle is substantially cylindrical in configuration, said mixing and collection steps being effected along a radius of said cylindrical receptacle.

8. The method of claim 5 wherein said first dielectric material comprises a mass of polystyrene beads having conductive metallic particles mixed therewith, said second dielectric material comprising plain polystyrene beads of the same type as comprises the vehicle for said metallic particles.

9. The method of claim 5 wherein said fusing step comprises steam molding the material collected in said receptacle into a homogeneous mass, and thereafter subjecting said fused homogeneous mass to heat for an extended period of time to stablize the dimensions of said mass.

10. The method of fabricating a mass of varying index dielectric material which comprises feeding a first relatively high index dielectric material toward a predetermined discharge line having a length R, the amount $h_1$ of said first material being varied along said line R substantially in accordance with the equation:

$$h_1 = \frac{Kx}{R}\left(1 - \frac{x^2}{R^2}\right)$$

where $x$ is the dimension along said line R from a predetermined end thereof and K is a constant, feeding a second lower index dielectric material toward said discharge line, the amount $h_2$ of said second material being varied along the length R of said line substantially in accordance with the equation:

$$h_2 = \frac{K}{R}(\epsilon_{max}-1)x - h_1$$

where $\epsilon_{max}$ is the dielectric constant of said first material, mixing said first and second variably fed materials with one another along the length R of said discharge line, collecting said mixed materials in a collection receptacle while effecting relative motion between said receptacle and said discharge line, and fusing the collected material into a homogeneous mass.

11. The method of fabricating a mass of varying index dielectric material which comprises feeding a first relatively high index dielectric material toward a discharge line at a first varying rate along said line, feeding a second lower index dielectric material toward said discharge line at a second varying rate, different from said first varying rate, along said line, mixing said first and second variably fed materials with one another along said line, collecting said mixed variably fed materials in a receptacle while effecting relative motion between said receptacle and said line thereby to achieve a mass of material having a varying loading concentration which concentration is the joint function of both said first and second varying feed rates, and fusing the collected material into a solid mass.

References Cited by the Examiner

UNITED STATES PATENTS

| | | | |
|---|---|---|---|
| 2,761,141 | 8/1956 | Strandberg et al. | 343—911 |
| 3,001,267 | 9/1961 | Heibel et al. | 29—155.5 |
| 3,015,102 | 12/1961 | Crane et al. | 343—911 |
| 3,082,510 | 3/1963 | Kelly et al. | 29—155.5 |

ROBERT F. WHITE, *Primary Examiner.*

HERMAN K. SAALBACH, *Examiner.*

W. K. TAYLOR, M. R. DOWLING, *Assistant Examiners.*